United States Patent
Yamada et al.

(10) Patent No.: US 6,823,859 B2
(45) Date of Patent: Nov. 30, 2004

(54) FLAT HEATING SURFACE TYPE GAS STOVE

(75) Inventors: Yutaka Yamada, Tokyo (JP); Kiyoshi Nakayama, Tokyo (JP)

(73) Assignee: Tokyo Gas Company Limited, Tokyo (JP)

( * ) Notice: Subject to any disclaimer, the term of this patent is extended or adjusted under 35 U.S.C. 154(b) by 0 days.

(21) Appl. No.: 10/602,723

(22) Filed: Jun. 25, 2003

(65) Prior Publication Data

US 2004/0060552 A1 Apr. 1, 2004

Related U.S. Application Data

(62) Division of application No. 10/038,908, filed on Jan. 8, 2002, now Pat. No. 6,609,513.

(30) Foreign Application Priority Data

Jan. 10, 2001 (JP) ............................................. 2001-2890

(51) Int. Cl.[7] ................................................ F24C 3/00
(52) U.S. Cl. ................. 126/39 J; 126/39 K; 126/92 R; 431/328
(58) Field of Search ............................. 126/39 K, 39 J, 126/92 R, 39 R, 92 AC, 92 A; 432/175; 431/115, 5, 116, 326, 328, 215, 207

(56) References Cited

U.S. PATENT DOCUMENTS

| | | | | |
|---|---|---|---|---|
| 3,299,938 A | * | 1/1967 | Bally et al. ................. | 431/210 |
| 4,889,481 A | * | 12/1989 | Morris et al. ................ | 431/328 |
| 5,251,609 A | * | 10/1993 | Thibault et al. ............ | 126/39 J |
| 5,375,996 A | * | 12/1994 | Nakamura et al. .......... | 431/115 |
| 5,375,997 A | * | 12/1994 | Nakamura et al. .......... | 431/115 |

* cited by examiner

Primary Examiner—James C. Yeung
(74) Attorney, Agent, or Firm—Westerman, Hattori, Daniels & Adrian, LLP (57) ABSTRACT

There is disclosed a novel flat heating surface type gas stove which is capable of heating a heating substance across a heat resistance glass at practically applicable heating efficiency, overcoming any inconvenience resulting from the exposure of flame and facilitating the cleaning of the gas stove. This gas stove 10 comprises a heat resistance glass top plate 12 which is disposed over a burner 15, wherein a gas-permeable porous body 40 is disposed below said top plate 12, and a space between said top plate 12 and a surface of said gas-permeable porous body 40 is assigned to a combustion space S. Combustion gas generated is designed to be discharged through said gas-permeable porous body 40. As high-temperature combustion gas passes through said gas-permeable porous body 40, radiant heat B is generated from the surface of said gas-permeable porous body 40. Since the heating substance 4 is heated by both of heat conduction and radiation, high heating efficiency can be achieved.

2 Claims, 5 Drawing Sheets

FLAT HEATING SURFACE TYPE GAS STOVE

REFERENCE TO RELATED APPLICATIONS

This Application is a division of Application Ser. No. 10/038,908 filed Jan. 8, 2002, now U.S. Pat. No. 6,609,513.

BACKGROUND OF THE INVENTION

1. Field of the Invention

The present invention relates to a gas stove which is adapted for cooking in office or home, and in particular, to a flat heating surface type gas stove wherein a heat-resisting glass top plate is used as a flat heating surface, thereby preventing flame from being exposed out of the heating surface during the heating operation thereof.

2. Description of the Related Art

Figure 5:
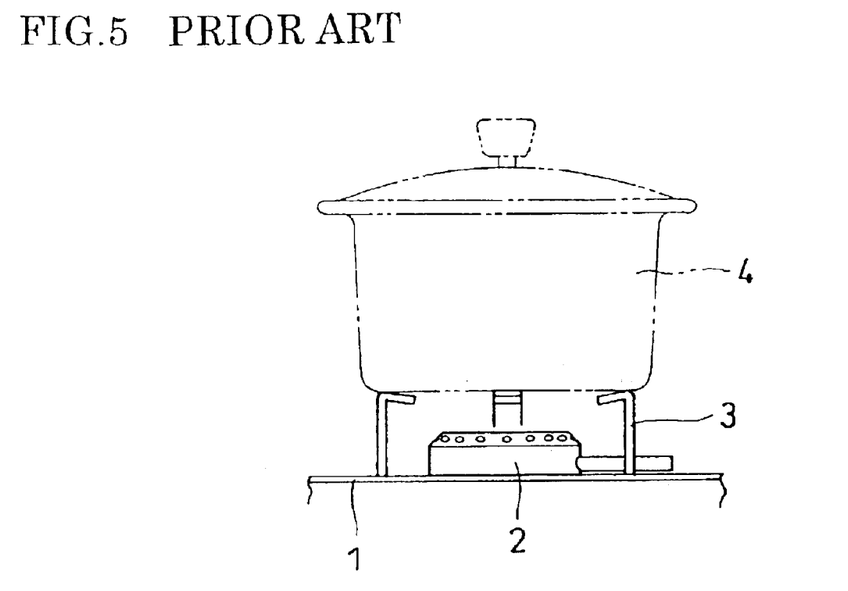
FIG. 5 is a side view schematically illustrating one example of conventional gas stove.

The conventional gas stove is generally designed such that a substance to be heated is directly heated by the flame that is generated by the combustion of gas. Specifically, as shown in FIG. 5, a heating substance 4, such as a pot or a frying pan (skillet), which is supported by means of a pan support 3 is placed over the combustion burner 2 that is exposed out of the top plate 1 of the stove. In the case of a conventional stove of this type, since the burner and the pan support are exposed, the stove is required to be frequently cleaned, and at the same time, since the surface structure thereof is rather complicated, it is difficult to completely sweep away soils from the surface of stove. Additionally, since flame is exposed during heating, radiant heat is transmitted directly to a person using the stove, thus occasionally imparting a feeling of heat to the person. Therefore, the person using the stove is required to pay some degree of attention to ensure safety in dealing with the stove.

Figure 6:
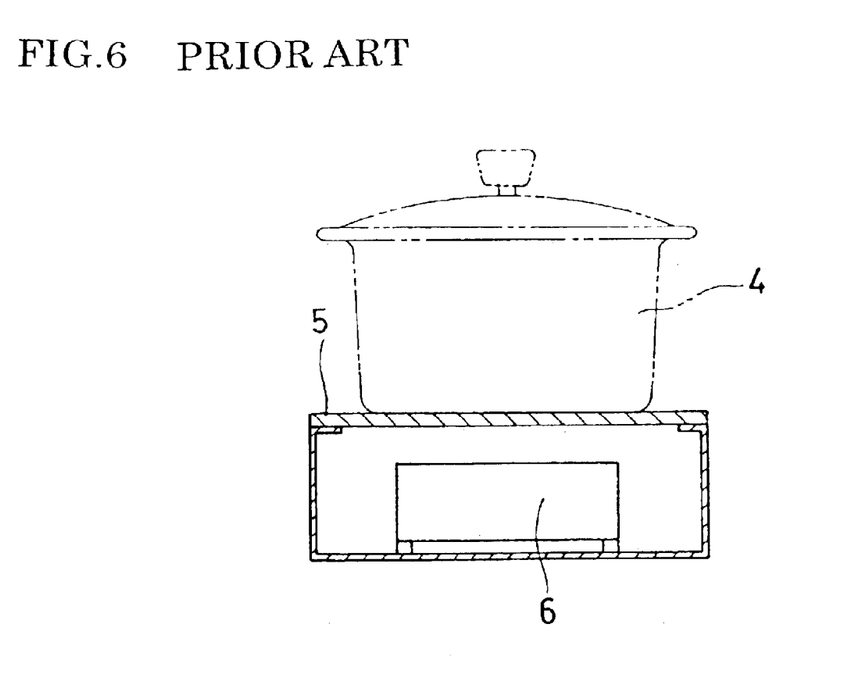
FIG. 6 is a side view schematically illustrating one example of conventional radiation type stove where an electric heater is disposed.

With a view to avoiding such an inconvenience, there has been proposed an electric stove, as shown in FIG. 6, which is constructed, as represented by an IH stove, a halogen stove or a radiant heat stove, such that the top plate 5 of stove is constituted by heat resistant glass such as ceramic glass, and that the heating substance 4 is heated by means of electromagnetic wave (including visible light and infrared ray) which is designed to pass through this glass top plate 5 as it is generated from a heater 6.

It is now studied to enable the same heating method as employed in the aforementioned electric stove to be realized in a gas stove where gas is employed as a fuel. However, since only the visible light and infrared rays generated through the combustion of gas can be utilized in heating a heating substance instead of directly utilizing the combustion gas, if the aforementioned method is adopted in a gas stove, the heating efficiency of such a gas stove would greatly deteriorate even if the gas stove is of an infrared burner type. Namely, it has been considered very difficult in such a gas stove to improve the heating efficiency thereof to a practically applicable level.

The present invention has been accomplished under the conditions explained above, and therefore, an object of this invention is to provide a novel flat heating surface type gas stove which is capable of heating a heating substance across a heat resistance glass at such high heating efficiency that is applicable to practical use in spite of the fact that the gas stove employs gas as a fuel, thus making it possible to overcome any inconvenience that may be brought about due to the exposure of flame, and to facilitate the cleaning of the gas stove.

BRIEF SUMMARY OF THE INVENTION

Namely, the gas stove according to the present invention is a flat heating surface type gas stove, which fundamentally comprises a heat resistant glass top plate which is disposed over a burner, wherein a gas-permeable porous body is disposed below said top plate, a space between said top plate and a surface of said gas-permeable porous body is assigned to a combustion space, and combustion gas to be generated is designed to be discharged through said gas-permeable porous body.

It is known that when a high-temperature gas is passed through a gas-permeable porous body, thermal energy is transferred from the high-temperature gas to the porous body and is then radiated from the surface of the porous body ("The improvements on the combustion and radiant heat in porous solid body", a collection of articles 52–475, B-1136; Japan Society of Mechanical Engineers). By increasing the porosity of the porous body, or by employing a material of high emissivity as a porous body, the radiation from the porous body can be increased, thus lowering the temperature of porous body and rapidly lowering the temperature of gas. As a high-temperature gas is passed through a gas-permeable porous body, even though the temperature of gas on the gas inlet side of the porous body is high, the temperature of gas on the gas outlet side of the porous body is lower. Therefore, the radiation from the porous body can be effected selectively on the high-temperature gas side, i.e. the upstream side of gas.

According to the present invention, the flat heating surface type gas stove which is provided with a heat resistance glass top plate disposed over a burner is technically featured in that the aforementioned phenomenon to be realized by the use of a gas-permeable porous body. Therefore, it is now possible to obtain a flat heating surface type gas stove which is capable of exhibiting such high-heating efficiency that can be practically used in spite of the fact that the gas stove employs gas as a fuel.

Namely, in the case of the gas stove according to the present invention, the combustion heat from the burner is transmitted to a heating substance by two ways. First, by the energy of heat conduction originating directly from the heat resistant glass top plate (flat heating surface). Second, by the radiation energy originating from the surface of gas-permeable porous body, that can be generated as the combustion gas of high-temperature produced inside the combustion chamber is permitted to pass through the gas-permeable porous body which is disposed below the top plate. As a result, it is now possible, with this gas stove, to realize high heating efficiency.

Moreover, in the gas stove according to the present invention, since the surface to support and heat a heating substance, such as a pot or a frying pan, is flat, the cleaning can be easily performed even if this surface is soiled by boiled-over matter. Additionally, since the combustion space of this gas stove is substantially closed so that the flame of combustion gas is not permitted to exit from the combustion space, it is possible to ensure a high operational safety.

As for the material of gas-permeable porous body which enables the aforementioned combustion gas to pass therethrough, there is not any particular limitation as long as it has a predetermined heat resistance. However, it is more preferable that the material of gas-permeable porous body is capable of emitting a higher radiation toward the upstream side as a high-temperature gas is passed therethrough. Preferable examples of such a gas-permeable porous body are those which are formed into a porous body by making use of silicon carbide exhibiting a high emissivity (0.9 or more) or a material containing silicon carbide as a main component. For example, an aggregate of silicon carbide fibers or ceramic filters can be preferably employed as the material of gas-permeable porous body.

The surface of gas-permeable porous body is heated up to almost the same temperature as that of the combustion gas as the high-temperature combustion gas passes through the gas-permeable porous body, thereby radiating thermal energy. In the course of the passage of combustion gas across the gas-permeable porous body, the temperature of combustion gas is lowered to become a low temperature gas, which is then discharged out of the gas stove. Even this low temperature gas, the temperature thereof is maintained generally at 600. or so. Therefore, heat radiation is generated even on the gas outlet side, i.e. rear side of the gas-permeable porous body. The heat radiation thus generated is directed toward the exhaust side of the gas stove, thus resulting in a heat loss to the gas stove.

With a view to minimize this heat loss, there is provided another embodiment of gas-permeable porous body wherein a second gas-permeable porous body having a lower emissivity than that of the first mentioned gas-permeable porous body is laminated on the gas outlet side of the first mentioned gas-permeable porous body. As for the material of the second gas-permeable porous body also, there is not any particular limitation as long as it has a predetermined heat resistance. However, it is more preferable that the material of the second gas-permeable porous body is formed of silica/alumina-based ceramic exhibiting an emissivity ranging from 0.2 to 0.3 or a material containing as a main component such a silica/alumina-based ceramic. For example, an aggregate of silica/alumina-based ceramic fiber can be preferably employed. Alternatively, a ceramic filter exhibiting a relatively low emissivity can be employed as the second gas-permeable porous body.

According to the flat heating surface type gas stove of the present invention, there is not any particular limitation with regard to the burner to be employed therein. For example, the burner may be a pipe burner which is disposed to surround a region immediately above the gas-permeable porous body or a surface combustion type burner. In the case of the former burner, the flame ports thereof are preferably disposed in such a manner that the flame from each flame port can be horizontally ejected in the direction toward the center of the region immediately above the gas-permeable porous body. If a sufficient combustion of gas can be achieved with only primary air, the arrangement of the burner may be such as mentioned above. Generally however, when it is desired to achieve a desired combustion of gas with only a primary air, the blow-off of flame or the generation of unburnt gas is caused to occur. In order to prevent such phenomena, the burner should preferably be designed such that a secondary combustion air can be supplied in the vicinity of each of the flame ports. In any cases, it is preferable to provide the burner with a suitable flame stabilizing mechanism.

In a structure where a surface combustion burner is employed, the combustion surface thereof, together with the surface of gas-permeable porous body, is disposed so as to face the combustion space. As a result, the combustion heat of the surface combustion burner can be effectively conducted to the flat heating surface constituted by the heat resistant glass top plate. Preferably, the combustion surface of the surface combustion burner should be formed of a material exhibiting a high emissivity, such as silicon carbide or a material containing silicon carbide as a main component. In this case, in addition to the heating by way of heat conduction, the heating by way of radiation energy can proceed, thereby making it possible to realize high heating efficiency by the surface combustion burner.

If the surface combustion burner is to be employed, the combustion surface thereof may be disposed on the periphery of the surface of the gas-permeable porous body, or the gas-permeable porous body may be disposed on the periphery of the combustion surface of the surface combustion burner. In any cases, a high-temperature combustion gas from the surface combustion burner is permitted to be discharged through the gas-permeable porous body, during which the gas-permeable porous body is heated to a red hot state, thus radiating thermal energy.

According to another embodiment of the gas stove of the present invention, the gas stove essentially comprises a combustion gas passageway communicated with a space located on a downstream side of combustion gas flow channel of gas-permeable porous body; an air passageway for combustion, and a heat-exchanging means acting between the combustion gas passageway and the air passageway for combustion, wherein a mixed gas comprising a combustion gas and combustion air which has been heated through heat exchange thereof with the combustion gas by means of heat-exchanging means is designed to be fed to a burner. In the case of gas stove of this embodiment, the quantity of heat retained in the combustion gas after the passage thereof through the gas-permeable porous body is transferred via the heat-exchanging means to the combustion air to thereby perform exhaust heat recovery. As a result, the air thus heated up and the combustion gas is enabled to be mixed together to form a mixed gas, which is then transferred to the burner for the combustion thereof, resulting in improved heating efficiency as a whole.

DETAILED DESCRIPTION OF THE INVENTION

Next, the flat heating surface type gas stove according to this invention will be explained with reference to specific embodiments.

Figure 1:
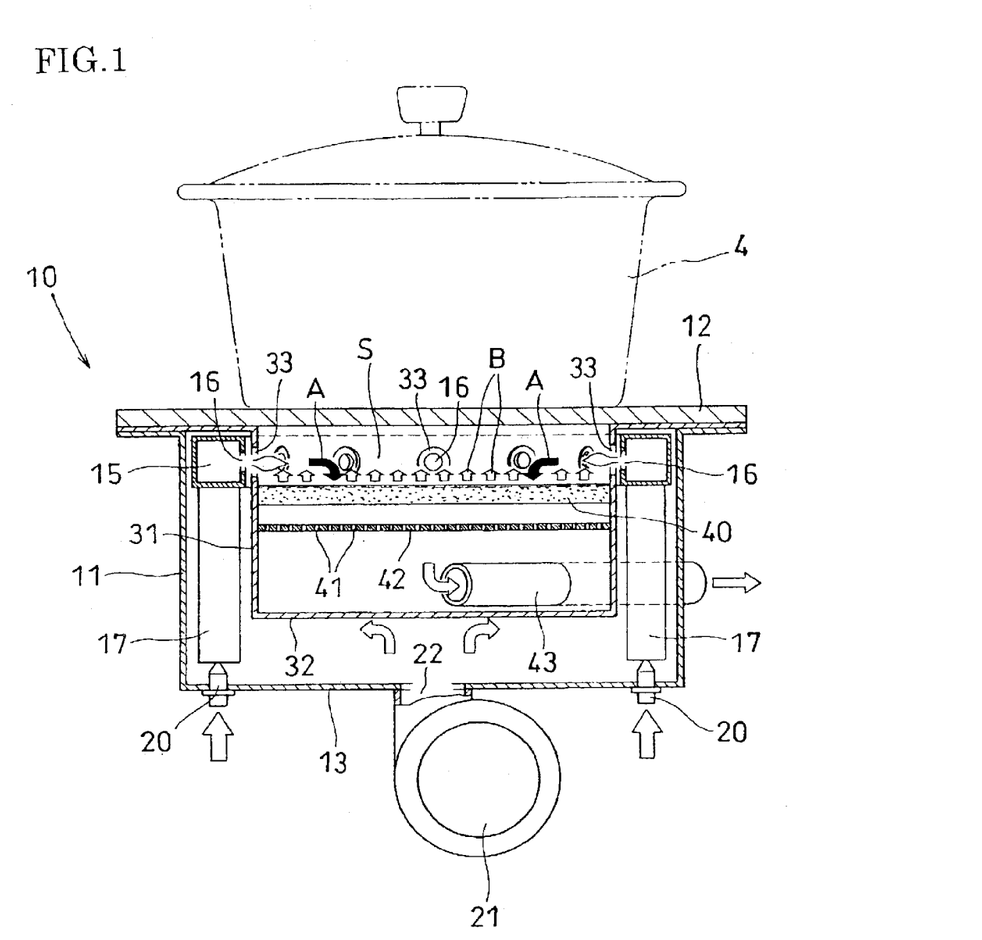
FIG. 1 is a cross-sectional view illustrating one embodiment of the flat heating surface type gas stove of the present invention.

FIG. 1 shows a cross-sectional view of one embodiment of the flat heating surface type gas stove according to this invention. The gas stove 10 shown in FIG. 1 is of a closed type wherein the open top face of an outer casing 11 having a cylindrical configuration is closed off by a flat heat resistant glass top plate. A ring-like pipe burner 15 is disposed along an upper inner wall portion of the outer casing 11. The pipe burner 15 is provided with a plurality of flame ports 16 which are disposed at predetermined intervals in such a manner that each flame port 16 is directed so as to enable the flame to be ejected horizontally toward the center of the outer casing 11. The pipe burner 15 is also provided with a suitable number of vertical pipes 17, the lower ends of which are respectively directed toward the bottom face 13 of the outer casing 11. Further, each of the vertical pipes 17 is provided, at the lower end thereof, with an opening with which a gas nozzle 20 is engaged. Moreover, the bottom face 13 of the outer casing 11 is connected with the outlet 22 of an air blower 21.

A cylindrical inner casing 31 having an open top and closed bottom 32 is disposed so as to cover the inner peripheral wall of the pipe burner 15. The cylindrical inner casing 31 is provided, at portions facing each flame port 16 of the pipe burner 15, with flame supply ports 33. A gas-permeable porous body 40 having a flat board-like configuration and made of an aggregate of silicon carbide fiber is disposed at a level of the inner casing 31 which is somewhat below where the flame supply ports 33 are disposed. A substantially closed space S is formed between the gas-permeable porous body 40 and the top plate 12. A metallic rectifying plate 42 provided with a large number of holes 41 is disposed below the gas-permeable porous body 40. Further, an exhaust pipe 43 is disposed below the rectifying plate 42 in such a way that the exhaust pipe 43 pierces through the peripheral wall of the inner casing 31.

The top plate 12 functions as a heating surface so that a heating substance 4, such as a pot or a frying pan, is permitted to be directly placed thereon. The heat resistant glass to be employed as the top plate 12 may be made of any kind of material which are conventionally known. However, a heat resistant glass imparted with a fine quartz crystalline structure and almost the same degree of thermal expansion coefficient as that of quartz is preferred. Since the thermal expansion coefficient of such a heat resistant glass is relatively low, there is little possibility that the glass can be cracked even if the glass is exposed to a high temperature state as it is heated by a burner. Although the gas-permeable porous body 40 is made of a single-layer structure of the aggregate of silicon carbide fiber in the embodiment shown in FIG. 1, the gas-permeable porous body 40 may be made of a 2-ply structure consisting of an upper layer (140) formed of the aggregate of silicon carbide fiber, and a lower layer (141) formed of the aggregate of silica/alumina-based ceramic fiber which is lower in emissivity than the silicon carbide fiber. This 2-ply structure is advantageous in improving the heating efficiency of gas stove.

On the occasion of combustion operation of gas stove, a predetermined quantity of fuel gas is fed from the gas nozzle 20 with the air blower 21 actuated. The air supplied by this air blower 21 to a space between the outer casing 11 and the inner casing 31 flows into the vertical pipe 17 so as to be mixed with fuel gas to form a mixed gas, that is then ejected from the flame ports 16 of the pipe burner 15 to form a flame. This flame is then permitted to pass through the flame supply ports 33 provided in the inner casing 31 and to spread throughout the combustion space S. Part of the air that has been supplied by the air blower 21 is permitted to enter into the combustion space S together with the flame ejected from the flame supply ports 33 of the inner casing 31 so as to assist the secondary combustion of flame. As a result, the complete combustion of the mixed gas can be promoted. The combustion heat produced by the combustion gas is thermally conducted from the top plate 12 to the heating substance 4 to thereby heat the heating substance 4.

The temperature of the combustion gas generally exceeds over 1000. As shown by the arrows "A" in FIG. 1, this high-temperature combustion gas is permitted to pass through the gas-permeable porous body 40 and the rectifying plate 42 before it is discharged from the exhaust pipe 43. As this high-temperature combustion gas is permitted to pass through the gas-permeable porous body 40, the top surface (the surface facing the top plate 12) of the gas-permeable porous body 40 is heated up to almost the same temperature as that of the combustion gas. As a result, thermal energy is radiated from the surface of the gas-permeable porous body 40 toward the top plate 12 (as shown by the arrows "B"), thereby providing radiation energy, through the top plate 12, to the heating substance 4 in addition to the heating by way of the aforementioned conduction of heat.

Namely, in the case of gas stove 10 according to the present invention, the combustion heat from the burner is transmitted to a heating substance 4 in two ways. First, by heat conduction originating directly from the heat resistant glass top plate 12. Second, by radiant heat produced from the surface of gas-permeable porous body 40 as high-temperature combustion gas passes through the gas-permeable porous body 40 which is disposed below the top plate 12. As a result, it is now possible, even with this type of gas stove where the flame is not permitted to be exposed outside the unit, to realize such high heating efficiency that is suited for practical use. It has been confirmed, through experimentation conducted by the present inventors, that the gas stove constructed as described in the above embodiment is capable of achieving heating efficiency which is comparable to that of the conventional gas stove as shown in FIG. 5 under the same conditions.

By the way, the gas stove 10 of the above embodiment is provided with a rectifying plate 42, so that the combustion gas is prevented from generating a drift current in the course wherein the combustion gas is transferred from the combustion space S via the gas-permeable porous body 40 to the exhaust pipe 43. However, this rectifying plate 42 may not be essential and can be omitted, provided that the drift current of the combustion gas can be confined within a tolerable degree through the adjustment of the mounting position or configuration of the exhaust pipe 43.

Further, in the above embodiment, although air for secondary combustion is utilized in the combustion of burner, the mechanism for introducing the air for secondary combustion may be omitted, provided that the complete combustion of gas without substantial unburnt gas can be achieved by making use of only the primary air and by providing the gas stove with a suitable means, such as a flame stabilizing mechanism, which is conventionally known. In that case, the structure of the gas stove can be further simplified. The outer casing 11 and the inner casing 31 may not be circular in the horizontal cross-sectional configuration thereof, and hence may be rectangular in the horizontal cross-sectional configuration thereof. In that case, the pipe burner may be constructed such that it is configured so as to be installed entirely along the inner peripheral wall or installed only at a couple of longer sidewalls facing each other.

Figure 2:
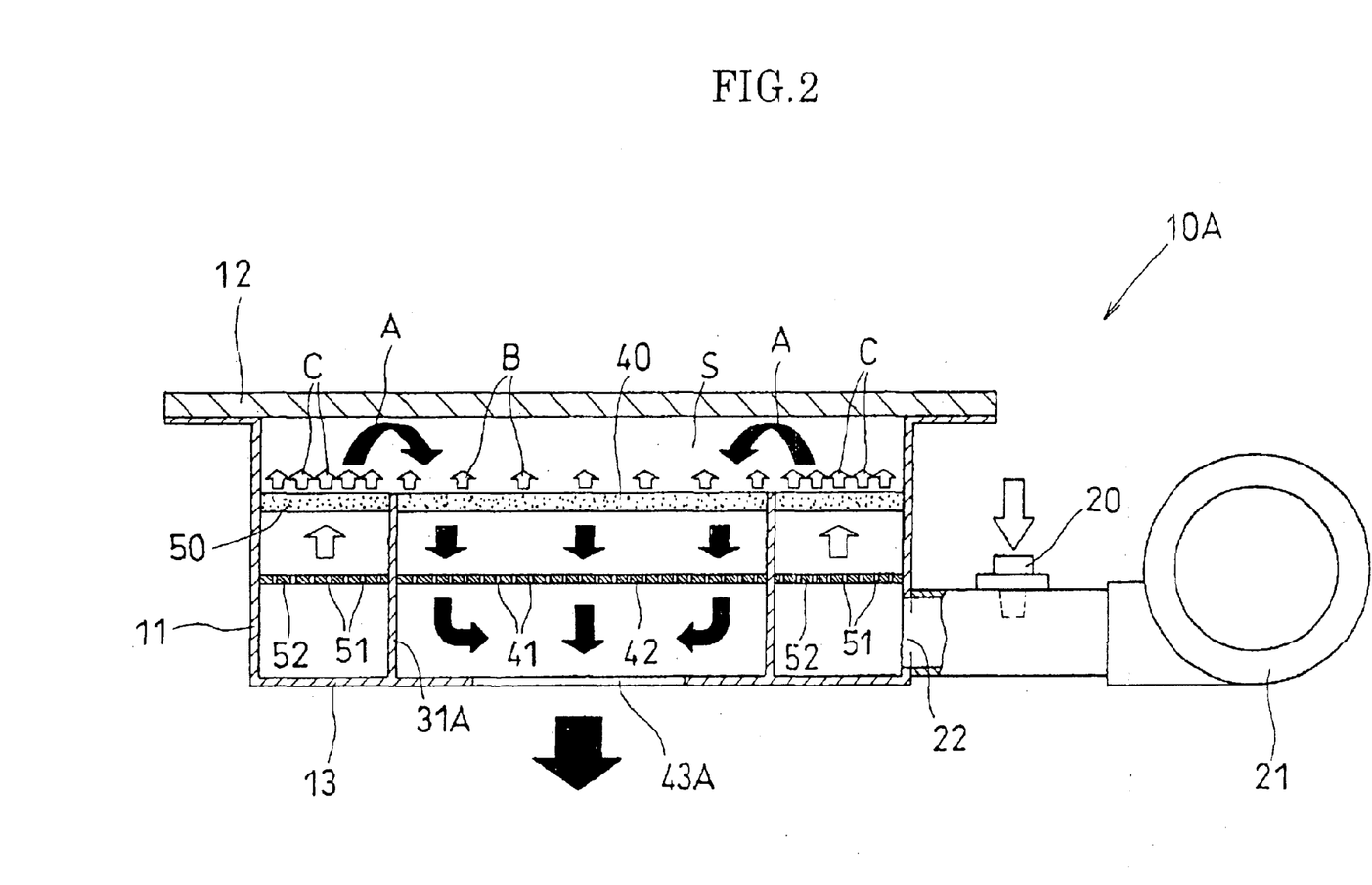
FIG. 2 is a cross-sectional view illustrating another embodiment of the flat heating surface type gas stove of the present invention.

FIG. 2 shows a cross-sectional view of another embodiment of the flat heating surface type gas stove according to this invention. The gas stove 10A shown in FIG. 2 differs from that shown in FIG. 1 in respect that the burner is constituted by a surface combustion burner. Namely, the gas stove 10A shown in FIG. 2 is the same as that shown in FIG. 1 in the respect that the open top face of an outer casing 11 having a cylindrical configuration is closed by a flat heat resistant glass top plate 12. However, the gas stove 10A features an inner casing wall 31A that is coaxially disposed inside the outer casing 11 in such a manner that the circumferential top end of the inner casing wall 31A is not in contact with the top plate 12, and that a ring-shaped combustion face-forming body 50 is horizontally interposed between the outer peripheral wall of the inner casing wall 31A and the inner peripheral wall of the outer casing 11. Further, the outlet 22 of an air blower 21 is connected with the peripheral wall of the outer casing 11, and the gas nozzle 20 is disposed on an upstream side of the outlet 22.

The combustion face-forming body 50 may be selected from any kind of combustion face-forming body that has been employed in the conventional surface combustion burner. In this embodiment however, a material exhibiting a high emissivity, such as an aggregate of silicon carbide fibers (the emissivity thereof is 0.9 or more) is employed.

As shown in FIG. 2, on the top end of the inner casing wall 31A, there is mounted a disc-shaped gas-permeable porous body 40 which is located, preferably, at the same level as that of the combustion face-forming body 50. Although it is not essential, a ring-shaped metallic rectifying plate 52 provided with a large number of holes 51 is disposed below the combustion face-forming body 50, and additionally, a disc-shaped metallic rectifying plate 42 provided with a large number of holes 41 is disposed below the gas-permeable porous body 40. Moreover, an exhaust hole 43A is formed at a region of the bottom 13 of the outer casing 11, which is encircled by the inner casing wall 31 A.

In the case of this gas stove 10A, the substantially closed space formed between the gas-permeable porous body 40 and the combustion face-forming body 50 functions as a combustion space S. Namely, when combustion occurs, the air blower 21 is actuated and a predetermined quantity of fuel gas is supplied from the gas nozzle 20. The mixed gas consisting of the fuel gas and combustion air is then permitted to enter into the space between the outer casing 11 and the inner casing wall 31A, and is stirred and mixed by means of the rectifying plate 52 to form a homogeneous gas mixture, which is then passed through the combustion face-forming body 50 and ejected therefrom so as to be ignited and burnt by a suitable means.

The combustion heat produced by the combustion gas is thermally conducted from the top plate 12 to the heating substance 4 to thereby heat the heating substance 4. Additionally, since the combustion face-forming body 50 is formed of an aggregation of silicon carbide fiber exhibiting an excellent emissivity, the heating substance 4 is also heated by the radiation energy (indicated by the arrows "C") originating from the surface of the combustion face-forming body 50, thereby making it possible to achieve high heating efficiency. Moreover, as in the case of the gas stove shown in FIG. 1, this high-temperature combustion gas is permitted to pass through the gas-permeable porous body 40 and the rectifying plate 42 before it is discharged from the exhaust hole 43A. During this process, thermal energy is radiated also from the surface of the gas-permeable porous body 40 toward the top plate 12 (as shown by the arrows "B"), thereby further enhancing the heating efficiency.

Figure 3:
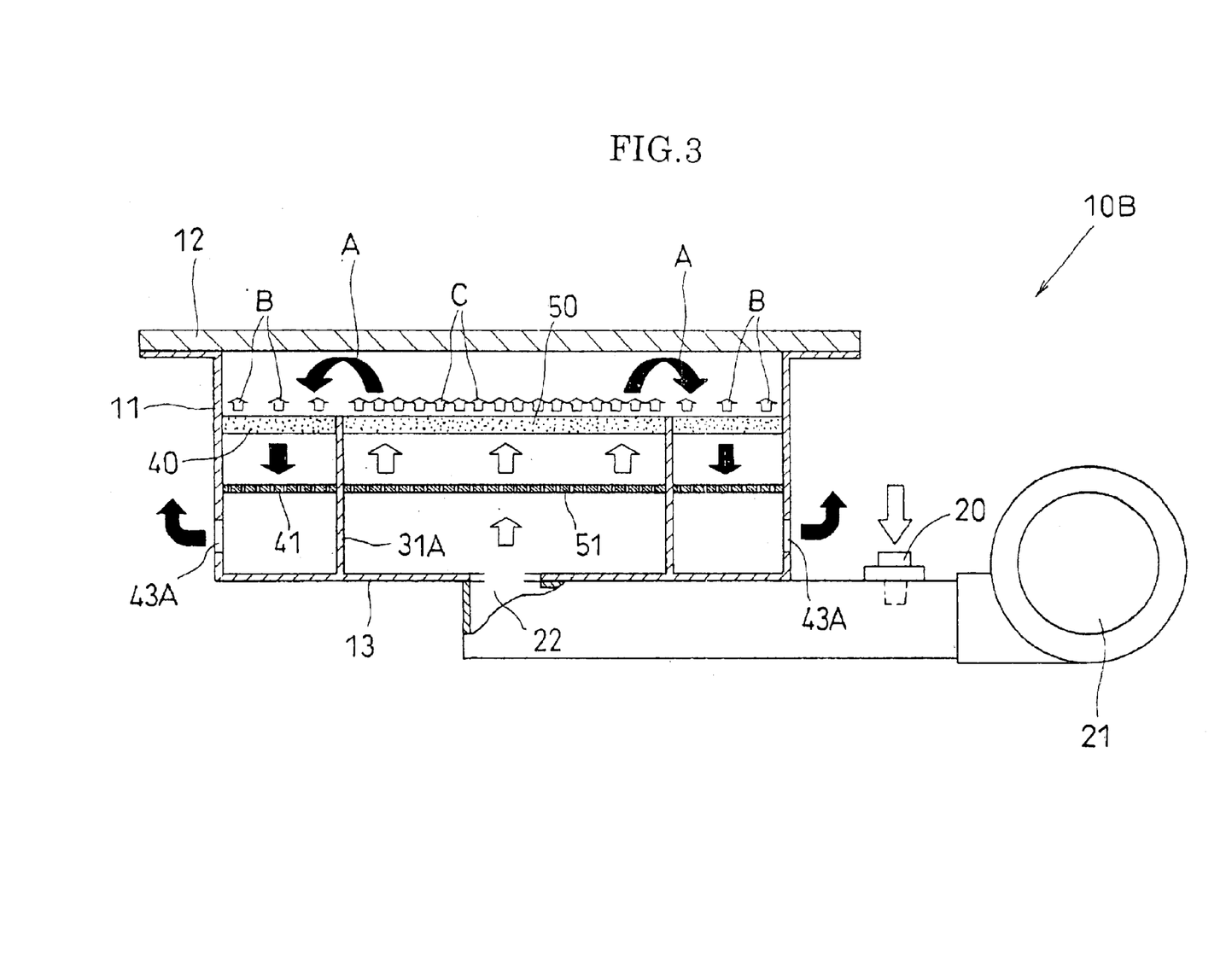
FIG. 3 is a cross-sectional view illustrating a further embodiment of the flat heating surface type gas stove of the present invention.

FIG. 3 shows a cross-sectional view of another embodiment of the flat heating surface type gas stove according to this invention. The gas stove 10B shown in FIG. 3 differs, just like the gas stove 10A shown in FIG. 12, from the gas stove 10 shown in FIG. 1 with respect that the burner is made of by a surface combustion burner. Furthermore, while the gas stove 10A shown in FIG. 2 is features the combustion face of surface combustion burner (the combustion face-forming body 50) disposed on the outer peripheral side of the gas-permeable porous body 40, the gas stove 10B, shown in FIG. 3, is features the gas-permeable porous body 40 disposed on the outer peripheral side of the combustion face of surface combustion burner (the combustion face-forming body 50). Therefore, the outlet 22 of an air blower 21 is connected with a region of the bottom 13 of the outer casing 11, which is encircled by the inner casing wall 31A, and an exhaust hole 33A formed in the peripheral wall of the outer casing 11.

The manner of heating the heating substance 4 on the occasion of combustion operation is substantially the same as in the case of the gas stove 10A shown in FIG. 2, so that the details thereof will be omitted by denoting the corresponding components or members by the corresponding reference numbers.

Figure 4:
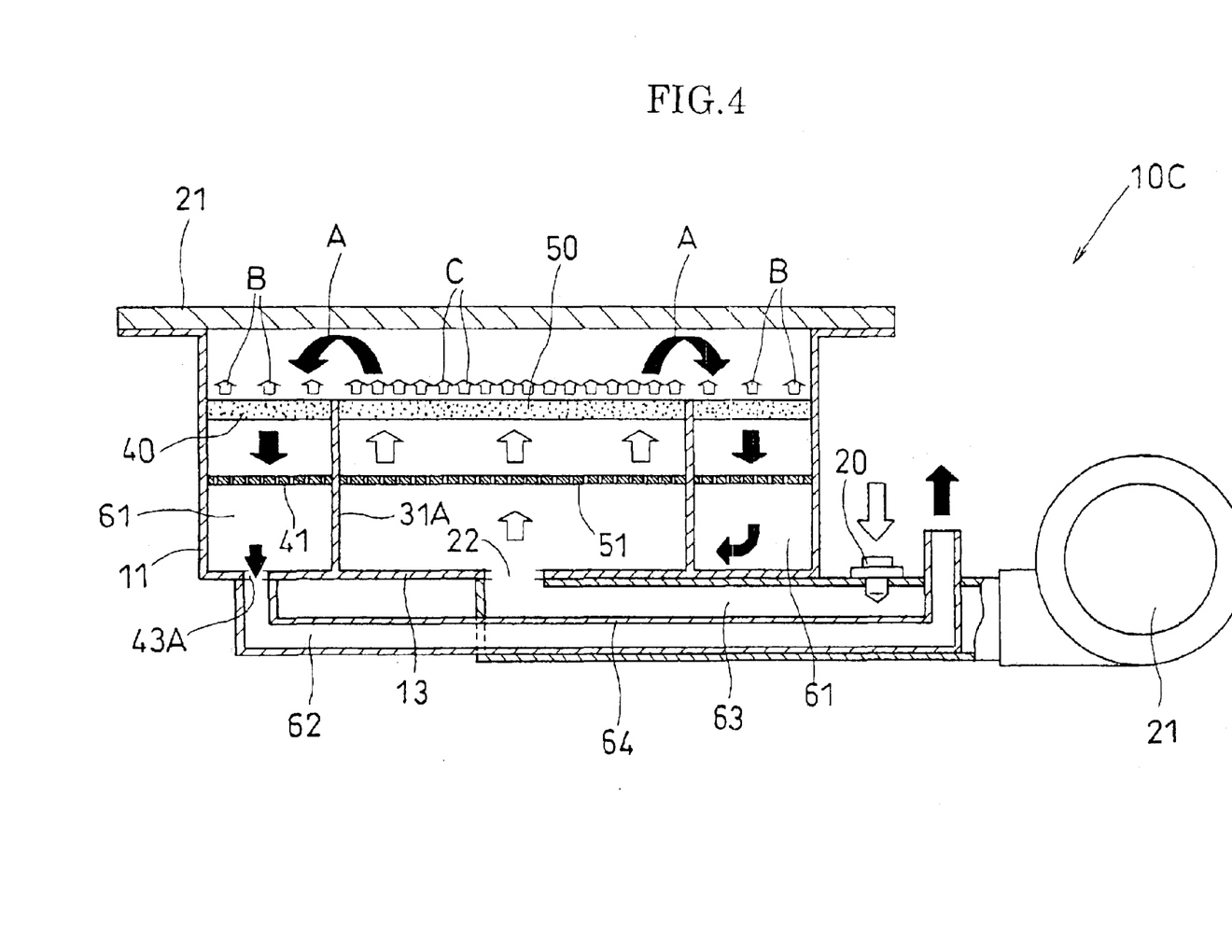
FIG. 4 is a cross-sectional view illustrating still another embodiment of the flat heating surface type gas stove of the present invention.

FIG. 4 shows a cross-sectional view of a further embodiment of the flat heating surface type gas stove according to this invention. The gas stove 10C shown in FIG. 4 differs from the gas stove 10B shown in FIG. 3 with respect that heat exchange is executed between the air being supplied for combustion and the combustion gas being discharged. In other respects, the constitution of gas stove 10C is substantially the same as that of gas stove 10B shown in FIG. 3, so that the details thereof will be omitted by denoting the corresponding components or members by the corresponding reference numbers.

The gas stove 10C shown in FIG. 4 comprises a combustion gas passageway 62 which communicates with a combustion gas flow channel 61 constituting a downstream side space of the gas-permeable porous body 40. This combustion gas passageway 62 is disposed so as to pass, via a partition wall 64, through the interior of a combustion air passageway 63 which is connected with the air blower 21. According to the gas stove 10C of this embodiment, the quantity of heat retained in the combustion gas after the passage thereof through the gas-permeable porous body 40 is transferred via the partition wall 64, functioning as heat-exchanging means, to the combustion air flowing inside the combustion air passageway 63 while the combustion gas passes through the combustion gas passageway 62 to thereby perform exhaust heat recovery. As a result, a mixed gas consisting of the air thus heated up and the fuel gas is enabled to be transferred to the surface combustion burner for the combustion thereof, resulting in further improved heating efficiency as a whole.

By the way, the aforementioned means for performing the heat exchange between the combustion gas and the combustion air to thereby execute exhaust heat recovery can be applied as it is not only to the gas stove 10B that is provided with the surface combustion burner as shown in FIG. 2, but also to the gas stove 10 that is provided with the pipe burner as shown in FIG. 1.

According to the present invention, it is possible to provide a novel flat heating surface type gas stove which is capable of heating a heating substance across a heat resistance glass at high heating efficiency sufficient for practical use in spite of the fact that the gas stove employs gas as a fuel, thus making it possible to overcome any inconvenience that may be brought about due to the exposure of flame, and to facilitate the cleaning of the gas stove.

What is claimed is:
1. A flat heating surface type gas stove comprising:
a heat resistant glass top plate which is disposed over a burner;
wherein a gas-permeable porous body is disposed below said top plate, a space between said top plate and a surface of said gas-permeable porous body is a combustion space where combustion gas is generated, and combustion gas generated in said combustion space is discharged through said gas-permeable porous body, wherein said burner is a surface combustion burner having a side with an outer and inner periphery, a combustion surface of said surface combustion burner and a surface of said gas permeable porous body facing toward said combustion space, and wherein the surface of said gas-permeable porous body is placed on the outer peripheral side of the combustion surface of said surface combustion burner; and wherein the gas-permeable porous body is formed of silicon carbide or a material containing silicon carbide as a main component.

2. A flat heating surface type gas stove comprising:

a heat resistant glass top plate which is disposed over a burner;

wherein a gas-permeable porous body is disposed below said top plate, a space between said top plate and a surface of said gas-permeable porous body is a combustion space where combustion gas is generated, and combustion gas generated in said combustion space is discharged through said gas-permeable porous body, wherein said gas stove further comprises a combustion gas passageway communicated with a space located on a downstream side of combustion gas flow channel of gas-permeable porous body; an air passageway; and a heat-exchanging means acting between the combustion gas passageway and the air passageway for combustion;

wherein a mixed gas comprising a combustion gas and combustion air, which has been heated through heat exchange thereof with the combustion gas by means of said heat-exchanging means is fed to said burner; and wherein the gas-permeable porous body is formed of silicon carbide or a material containing silicon carbide as a main component.

* * * * *